United States Patent

[11] 3,577,887

[72] Inventors Guy Lambert
St. Egreve;
Marcel Macaire, Grenoble, France
[21] Appl. No. 879,762
[22] Filed Nov. 25, 1969
[45] Patented May 11, 1971
[73] Assignee Merlin Gerin, Societe Anonyme
Grenoble, France
[32] Priority Dec. 20, 1968
[33] France
[31] 179775

[54] ENERGY STORAGE CONTROL DEVICE, IN PARTICULAR FOR ELECTRIC CIRCUIT BREAKERS
9 Claims, 5 Drawing Figs.

[52] U.S. Cl................................................. 74/2,
200/153SC
[51] Int. Cl....................................................... G05g 17/00
[50] Field of Search........................................... 74/2;
200/153 (SC)

[56] References Cited
FOREIGN PATENTS
799,665 8/1958 Great Britain................ 74/2
OTHER REFERENCES
German printed application; Wanderer 1,040,651 10/1958; 200/153(SC)

*Primary Examiner*—Milton Kaufman
*Attorney*—Stevens, Davis, Miller & Mosher

ABSTRACT: A stored energy closing mechanism for a circuit interrupter comprising a toggle linkage cooperating with stationary guide means so as to allow the scheduling of the torque exerted by the closing spring on the charging device and on the driven parts of the circuit interrupter during the operation of the mechanism.

Patented May 11, 1971
3,577,887
3 Sheets-Sheet 1
Fig.1
Fig.2
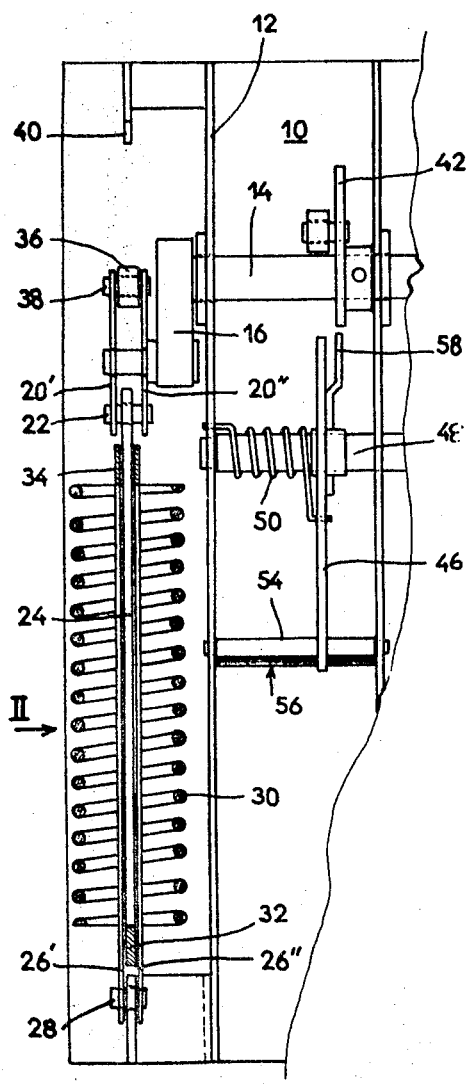
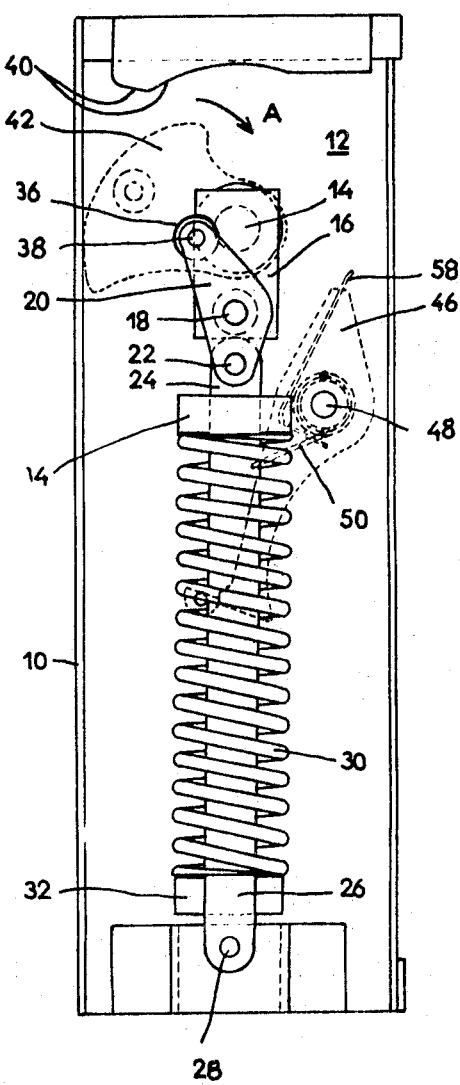
INVENTORS
GUY LAMBERT,
MARCEL MACAIRE
BY
Stevens, Davis, Miller & Mosher
ATTORNEYS

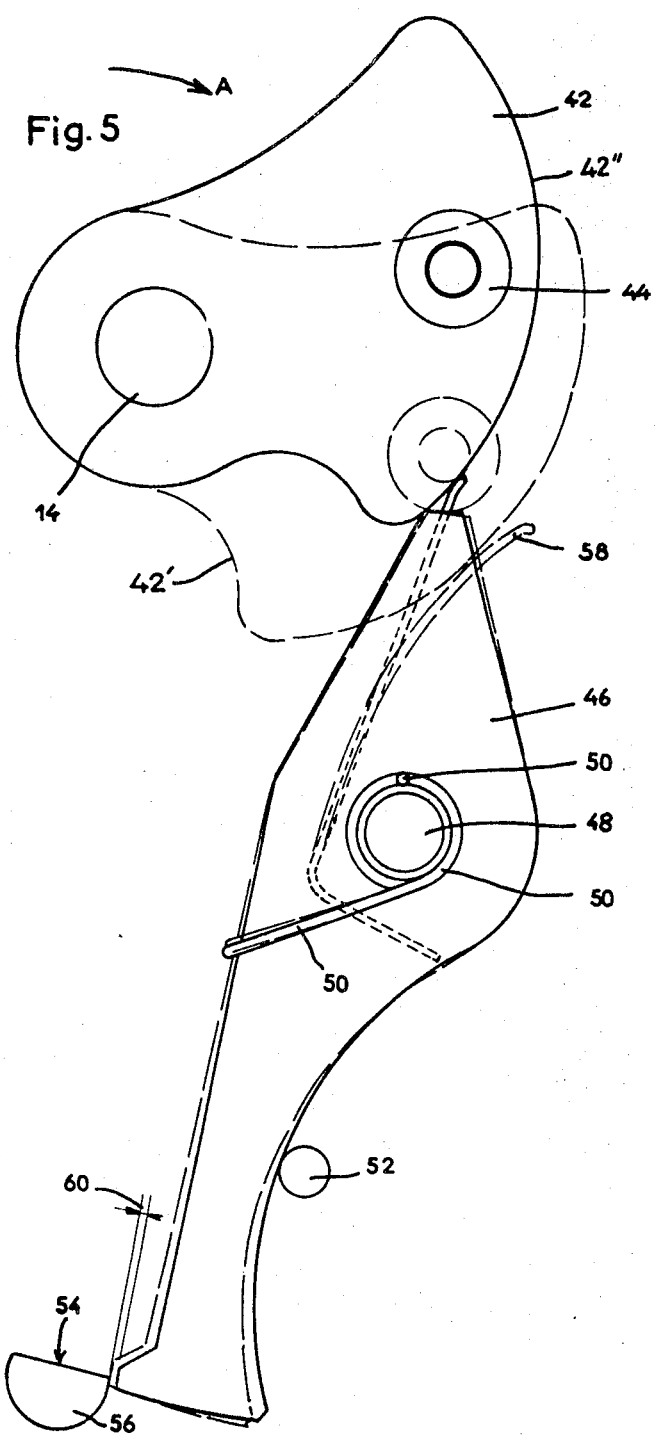

ENERGY STORAGE CONTROL DEVICE, IN PARTICULAR FOR ELECTRIC CIRCUIT BREAKERS

The present invention relates to an energy storage control device adapted in particular to cause the closing of an electric circuit breaker, in which a rotary shaft is intermittently driven by a drive device and operates the contacts of the circuit breaker. Devices of this type are known in which the circuit breaker is closed and its opening springs charged by one or more powerful closing springs which have been previously charged by means of a driving device which may be an electric motor with speed reducer or a manual device such as a reciprocating lever. The energy of the driving device is imparted to the spring storage device by a suitable transmission which frequently comprises a step-by-step mechanism such as a ratchet wheel cooperating with pawls, or a freewheel mechanism.

The known devices generally comprise a large number of transmission elements, which is necessary in order to obtain an acceptable curve of the torque exerted by the storage device on the said rotary shaft for different angular positions of the latter.

It is an object of the invention to provide a simpler and less expensive stored energy closing device comprising a minimum of transmission parts between the driving device and the storage device, said parts being furthermore easy to manufacture, for instance by stamping.

Another object of the invention is to create a universal control device for a large number of circuit breakers, the adaptation to each circuit breaker being effected by the suitable selection of a simple guide cam which can be exchanged as a function of the variation of the specific resistant torque of the circuit breaker in question. A further object of the invention is to obtain a high initial torque exerted by the storage device on the moving unit of the circuit breaker at the start of the closing operation. Still another object of the invention is to make it possible to have at each moment during the closing operation a driving torque which is statically greater than the resistant torque opposed by the receiving member, such as the moving contacts of the circuit breaker. In this way the control can be designed without taking into account any dynamic effect or flywheel effect which is necessary in the known controls to overcome a peak of the resistant torque.

Another object of the invention is to increase the length of the driving stroke of the rotary shaft during which the storage device returns its stored energy and to fix it, for instance, at above 180°, thus decreasing the forces and accelerations acting on certain parts of the control and therefore increasing their life, the charging stroke being shorter.

Another object of the invention is to improve the abutting of the said rotary shaft at the end of its charging stroke.

One embodiment of the invention shown in the accompanying drawing will now be described, without the applicant, however, intending to limit the scope of its invention to the details or by the details of the example given by way of illustration.

In the accompanying drawings:

FIG. 1 is a front elevation of a part of an energy storage control device of an electric circuit breaker, the storage device being shown in condition of rest before its recharging;

FIG. 2 is a side view seen in the direction of the arrow II in FIG. 1;

Figure 3:
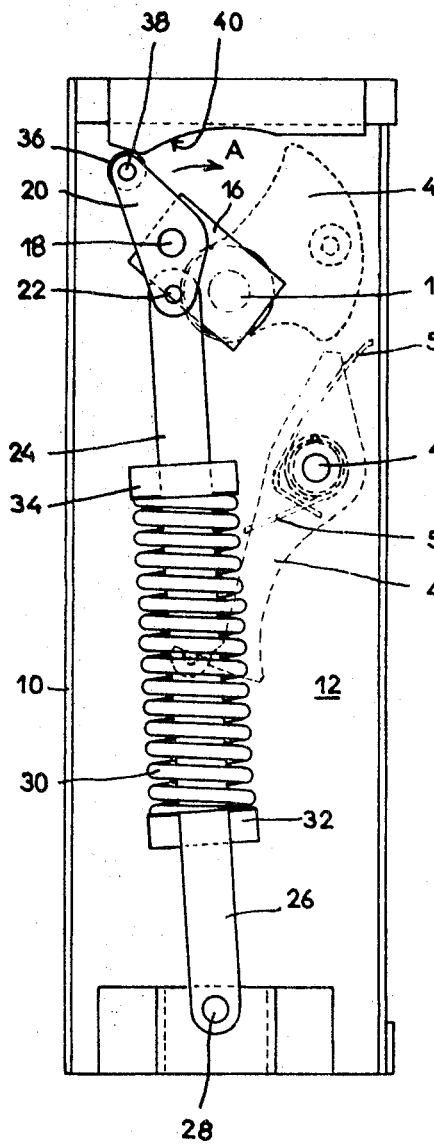
Figure 4:
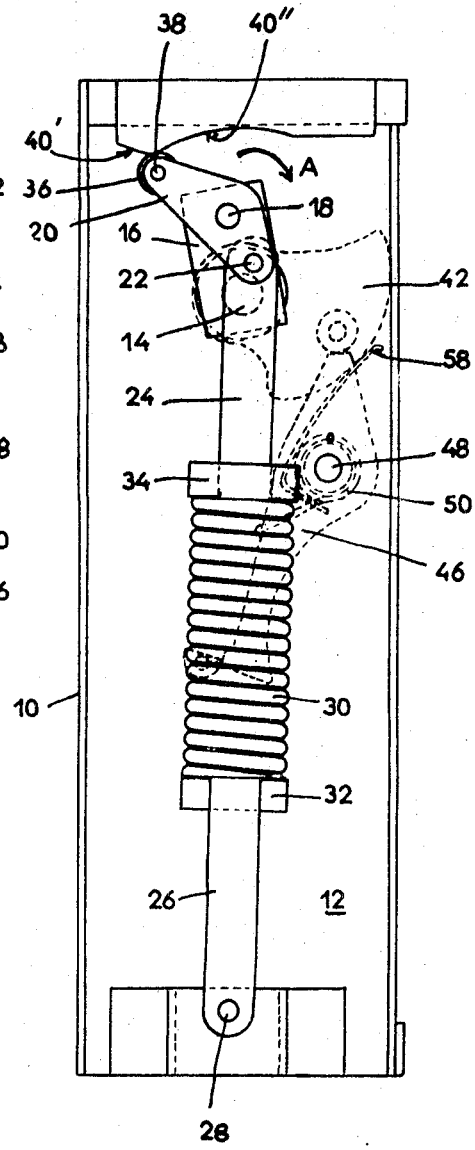

FIG. 3 corresponds to FIG. 2 but shows the device in an intermediate position during charging;

FIG. 4 shows the device at the end of the charging stroke; and

FIG. 5 shows, on a larger scale, the abutment members shown in dashed lines in FIGS. 2, 3 and 4.

In the FIGS. there have been shown only the parts of a control device which are essential in order to understand the nature and operation of the device of the invention, the other parts being conventional and well known to those skilled in the art.

The frame or base of the control device comprises a partition wall 12 traversed by a rotary shaft 14 which is periodically driven in unidirectional rotation in the direction indicated by the arrow A by an intermittent or continuous movement which is imparted, for instance, by a driving device (not shown) comprising an electric motor with speed reducer or a manual reciprocating lever cooperating with a ratchet wheel via a set of pawls, or else with a set of free wheels. This drive of the rotary member 14 does not form part of the invention proper and will therefore not be described in further detail, it being understood that its role is to turn the shaft 14 through an angle sufficient to charge the storage device and to lock it in charged or energy-stored state, whereupon the drive ceases (by stopping or disconnection, for instance).

A crank 16 is keyed onto the shaft 14 and has a crankpin 18 which passes through a lever 20 comprising two sideplates 20' and 20''. One end of the lever 20 is articulated to a pin 22 borne by the upper end of a spring operating rod 24 which passes through a spring support member 26 having two connected bars 26' and 26''. The spring support 26 is articulated at its lower end on a pin 28 which is mounted on the frame 10. A coil spring 30 surrounds the bars 24 and 26', 26'' and rests at the one end against a lower spring seat or crossmember 32 sliding between the bars 26' and 26'' and rigidly connected with the lower end of the operating rod 24 and at the other end on an upper spring seat or crossmember 34 which is rigidly connected with the upper end of the spring support 26. The compression spring 30 is a coil spring the force of which is sufficiently high to be able to overcome the opposing force exerted by the controlled receiving member (not shown), for instance by the moving unit of a circuit breaker during the closing course, with due consideration of the lever arms, frictional losses, etc.

The end of the lever 20 opposite that which is articulated at 22 on the charging rod 24 bears a roller 36 which in its turn is articulated on the pin 38 passing through the sideplates 20' and 20''. This roller comes into contact and follows a stationary guide path or cam 40 at a given time during the charging of the energy storage device 30, as will be explained in further detail below.

On the other side of the partition wall 12, a cam 42 is keyed onto the shaft 14. This cam 42 has various functions:

it assures the driving of the receiving member, such as the closing of a circuit breaker, in a suitable manner which is not the object of the present invention and which therefore will not be described in further detail; it may be imagined that this drive takes place when the concave portion 42' and/or the convex portion 42'' of the cam lobe comes against a roller which operates the movable contacts of a circuit breaker;

it assures the abutting of the rotary shaft 14 after the effecting of the charging of the spring 30 and for this purpose it bears a roller 44 constituting an abutting member which at the end of the charging stroke comes against the upper end of a pivoting lever or latch 46 which pivots at 48 on a fixed pin;

it attenuates the unfavorable effects of too sudden an abutment of the roller 44 against the latch 46 in a manner which will be described below.

A torsion spring 50 strives at all times to turn the latch 46 in anticlockwise direction by pulling it back against a fixed stop 52 (shown only in FIG. 5). A crescent-shaped milling 54 in a rotary shaft 56 constitutes the locking member or pawl for the lower end of the latch 46 and a swinging of this tripping shaft 56 in clockwise direction liberates the latch 46. A leaf spring 58 is arranged in antenna form on the latch 46, its lower end being rigidly connected with the latch 46, while its upper part can rest against the convex surface 42'' of the cam 42. A slight clearance 60 is present between the shaft 54 and the foot of the latch 46 when the latter is subjected only to the action of the return or bias spring 50.

This arrangement operates in the following manner:

Assuming that the device is in its position of rest in the uncharged state shown in FIGS. 1 and 2. In order to charge the storage spring 30, which can be effected automatically immediately after the closing of the circuit breaker, the shaft 14 is turned in the direction indicated by the arrow A. The crankpin 18 then starts to turn, describing a circular arc the center of which is identical with the center of the shaft 14. As long as the roller 36 is free, the spring will be charged by the moving apart of the pins 22 and 28, the spring support 26 pivoting slightly around the pin 28 in such a manner that the centers of the pins 18, 22 and 28 remain aligned. At a certain time during the rotation of the shaft 14, the roller 36 strikes the portion 40' of the cam 40 (see FIG. 3) and causes the folding or collapse of the toggle consisting of the lever 20 and the operating rod 24, forcing the pin 22 to move away towards the right by the swinging of the lever 20 in the anticlockwise direction. As a result of this, the line of action, established by the straight line connecting the center of the pins 22 and 28, swings further towards the right than it would have done in the absence of the guiding of the roller 36. There results from this— —in the end-of-charging position shown in FIG. 4—the roller 36 having now started its travel on the portion 40" of the guide path 40—an initial torque (initial with respect to the subsequent operation of the restoration of the energy stored in the spring 30) which is high as compared with the driving torque obtained in the known controls, in which there is only a slight passage beyond the dead center in the end-of-charging and start-of-return position. This increased torque can be maintained at the start of the energy restoration stroke when the roller 36 continues to travel on the portion 40" of the guide cam, while the shaft 14 continues to turn in the direction of the arrow A, and it is obvious that one can modify as desired the curve of the driving torque as a function of the angle of rotation of the shaft 14 by imparting a suitable shape to the guide path 40. In particular, one can readily obtain the result that the driving torque is greater than the resistant torque of the apparatus controlled during the entire control stroke and whatever the variation of said resistant torque as a function of the said angle of rotation, which makes it possible to overcome constraints imposed by the flywheel effect of the different moving parts. The invention also makes it possible to lengthen, for instance to 210°, the angular restoration stroke as compared to the known solutions in which both strokes are substantially 180°.

In the foregoing there has been somewhat anticipated the effecting of the abutment of the rotary member 14, 16, 42 at the end of the charging stroke. As a matter of fact, shortly before the end of this stroke (see the position shown in solid lines in FIG. 5), the cam 42 which is rigidly connected with the shaft 14 starts at its convex peripheral field 42" to enter into contact with the end of the spring blade 58 arranged as antenna on the latch 46. The latter is then again applied against the stop 52 under the action of the spring 50. Upon continuing to rotate, the cam 42 bends the spring 58, which causes a slight swinging in clockwise direction of the latch 46 which applies itself gently at its heel against the release shaft 56. A few moments later, the roller 44 of the cam 42 strikes sharply against the nose of the upper end of the latch 46 without being able to displace the latch further (see the position shown in dashed lines in FIG. 5). The roller 44 then exerts a large torque on the latch 46, tending to swing the latter in clockwise direction. This torque is higher the more the cam 40 has moved the pin 22 towards the right of the line connecting the pins 18 and 28. The force transmitted by the flexed spring 58 adds a constant torque which tends to turn the latch 46 in clockwise direction and in order to liberate the energy stored in the spring 30, it is sufficient to cause the pawl 54 to turn slightly in clockwise direction so as to cause the swinging in the same direction and the retraction of the latch 46 and the prolonged rotation, in the direction indicated by the arrow A of the cam 42, of the shaft 14 and of the crankpin 16 under the action of the spring 30 which relaxes. During this driving stroke, which may extend, for instance, over a pivot angle of 180°, the cam 42 drives a member which is to be controlled, for instance the moving unit of a circuit breaker which is to be closed, in a suitable manner which does not form the object of the present invention. By way of illustration, the concave portion 42' of the cam may strike against a drive roller. During the start of this driving stroke of the rotary member 14, 42, the roller 36 rolls on the cam section 40", which makes it possible to adapt the driving torque to the resistant torque, as explained above.

At the end of the drive stroke, the latch 46 has returned to its initial position due to the action of the spring 50. Furthermore, the charging of the spring 30 is then immediately assured, for instance by the action of a limit contact actuating an electric motor which controls the periodic rotation of the shaft 14. After the abutment of the roller 44 against the nose of the latch 46, the control device is again ready to actuate the receiving member.

We claim:

1. A stored energy control mechanism comprising a frame, an operating shaft rotatably mounted in said frame, closing spring means, crank means having crankpin means on said shaft, said spring means including toggle linkage means connected to said crankpin means to charge said spring means, and guide means acting on said toggle linkage means to cause it to control the folding and the unfolding of said toggle linkage means during the rotation of said shaft.

2. A stored energy control mechanism comprising a frame, an operating shaft rotatably mounted in said frame, closing spring means, crank means having crankpin means on said shaft, said spring means including a spring-operating rod, a lever pivotally connected intermediate its ends to said crankpin means, one of the end portions of said lever being pivotally connected to said operating rod, and cam means acting on the other end portion of said lever to control the pivoting of said lever about said crankpin means during the rotation of said shaft.

3. A stored energy control mechanism comprising a frame, an operating shaft rotatably mounted in said frame, closing spring means, crank means having crankpin means on said shaft, said spring means including a movable spring seat for said spring, a rod having an end portion, a lever pivotally connected intermediate its end portions to said crankpin means, a first end portion of said lever being pivotally connected to said end portion of said rod, relatively stationary guide means cooperating with the second end portion of said lever to control the angular position of said lever as a function of the angular position of said shaft.

4. A stored energy control mechanism comprising a frame, an operating shaft rotatably mounted in said frame, closing spring means, crank means having crankpin means on said shaft, said spring means including a stationary pin, a toggle linkage pivotally connected to said crankpin means, said toggle linkage comprising a spring-operating rod and a control lever, an axis to pivotally connect said rod and said lever, a spring guiding member pivotally connected to said stationary pin, said rod and said member being arranged to slide one with respect to the other between said axis and said pin, and relatively stationary guide means cooperating with said control lever to control the angular position of said control lever as a function of the angular position of said shaft.

5. A stored energy, circuit interrupter closing mechanism comprising a frame, an operating shaft rotatably mounted in said frame, a crank mounted on said shaft, a crankpin on said crank, a closing spring means including a spring-operating rod to charge said spring, a lever pivotally mounted on said crankpin and connected to said operating rod, and guide means to schedule the angular position of said lever during the rotation of said shaft.

6. A mechanism according to claim 5, wherein said lever is pivotally mounted on an axis of said rod.

7. A mechanism according to claim 6, further comprising a relatively stationary axis on said frame, a spring supporting member pivotally connected to said relatively stationary axis, said spring supporting member being connected to a first spring seat and said spring-operating rod being connected to a second spring seat whereby the longitudinal sliding movement of said spring supporting member with respect to said rod changes the amount of stored energy of said spring, said guide means being relatively stationary mounted on said frame to bring said rod axis to an offcenter position between said crankpin and said relatively stationary axis during a substantial part of the rotation of said shaft.

8. A mechanism according to claim 5, wherein said guide means comprise a cam surface cooperating with a cam follower on said lever.

9. A mechanism according to claim 8, wherein said cam surface comprises a V-shaped portion.